G. A. GIESELER.
PNEUMATIC CONVEYING MECHANISM.
APPLICATION FILED JAN. 2, 1920.
1,369,649.
Patented Feb. 22, 1921.
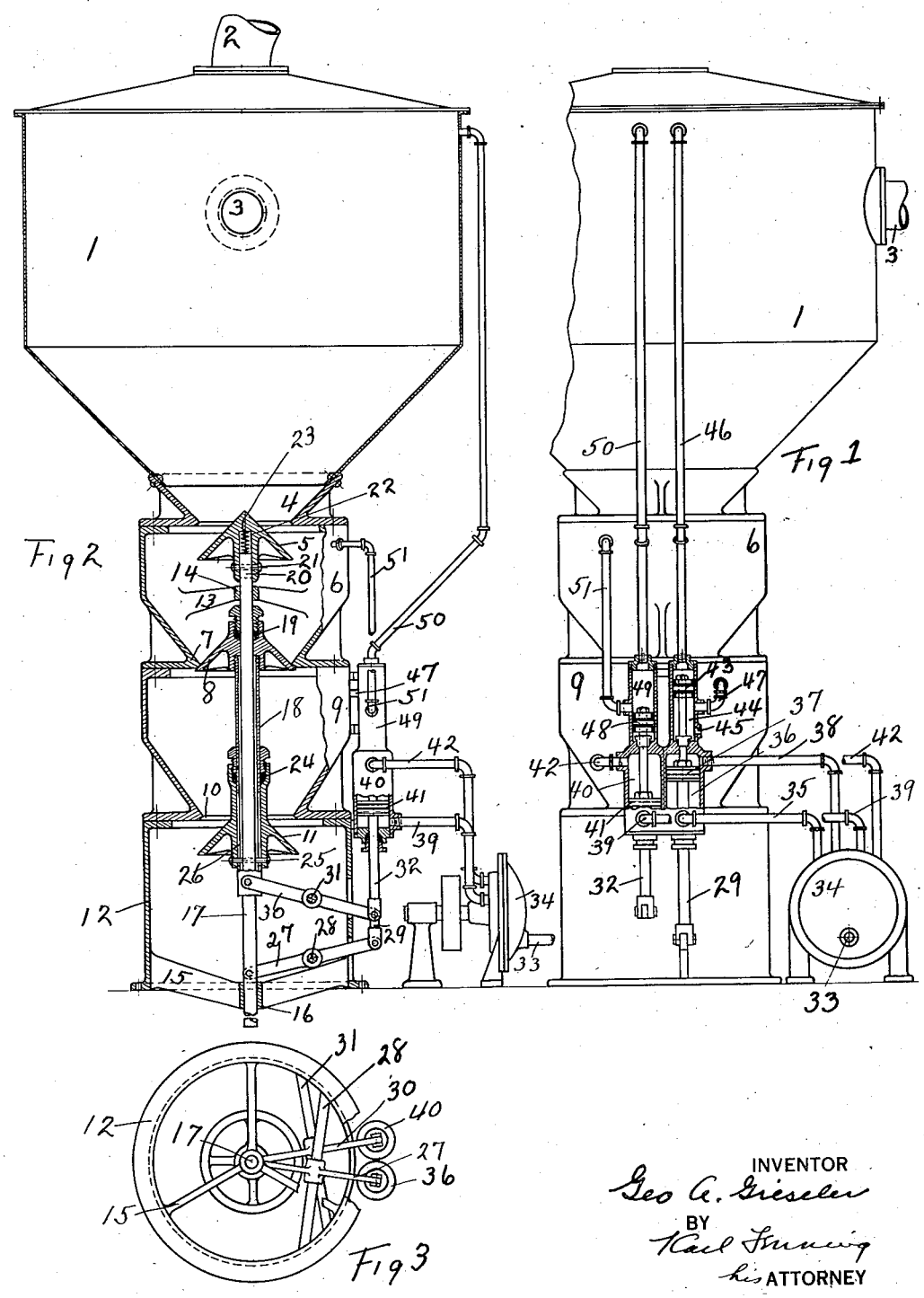

UNITED STATES PATENT OFFICE.

GEORGE A. GIESELER, OF CLEVELAND, OHIO.

PNEUMATIC CONVEYING MECHANISM.

1,369,649.   Specification of Letters Patent.   Patented Feb. 22, 1921.

Application filed January 2, 1920. Serial No. 348,855.

*To all whom it may concern:*

Be it known that I, GEORGE A. GIESELER, a citizen of Germany, residing at Cleveland, Ohio, have invented certain new and useful Improvements in Pneumatic Conveying Mechanisms, of which the following is a specification.

While not limited thereto the invention is particularly adapted for use in systems of pneumatic conveying which employ a vacuum or suction to convey material which is generally in a pulverized, powdered or granular condition. In such systems the material is generally discharged into a hopper in which, of necessity, a more or less perfect vacuum is maintained. The receiving hopper is generally of limited capacity and it is necessary to remove material from it in order to make room for incoming material and also to get the conveyed material in condition and position for use. Inasmuch as a vacuum is maintained within the receiving hopper, some means must be provided for preventing an inrush of atmospheric air when the hopper is opened for the discharge of the material. The present invention is directed toward providing a suitable discharging lock and apparatus incident to its use.

One form of apparatus embodying the invention will be described, and then the novel features will be pointed out in the claims.

In the accompanying drawings is shown an apparatus embodying the invention.

Figure 1 is a front elevation of a receiving hopper provided with the improved discharging lock. Fig. 2 is a vertical transverse section of Fig. 1. Fig. 3 is a bottom plan view of the lock and its operating mechanism.

A receiving hopper 1 of the usual form is provided with the usual exhaust pipe 2 and the usual inlet pipe 3 for the conveyed material. The hopper 1 is provided at its lower end with a discharging throat 4 into which projects a valve 5 which may close the throat. Below the throat 4 is a smaller chamber 6 having at its bottom a throat 7 which may be closed by the valve 8. Below the throat 7 is a chamber 9 somewhat larger in dimensions than the chamber 6 and provided at its lower end with a throat 10 which may be closed by the valve 11. In the present embodiment of the invention the valves 5, 8 and 11 are shown as cone valves. Below the throat 10 is a discharging chamber 12 through which the discharged material may pass onto the storage pile or bin or into a car or other carrier (not shown). Projecting inwardly from the sides of the chamber 6 is a spider 13 provided with a vertical bearing 14 at its center. Projecting inwardly from the walls of the discharging chamber 12 is a spider 15 provided with a vertical bearing 16 at its center. Mounted to slide vertically in the bearings 14 and 16 is a vertical rod 17. Surrounding the rod 17 for a part of its length is a sleeve 18 which may slide vertically on the rod. The valve 8 is mounted in the upper end of the sleeve 18 and is provided with a stuffing box 19 through which the rod 17 may slide vertically. Through a slot 20 toward the top of the rod 17 (and above the spider 13) passes a pin 21 which carries the valve 5. Within a socket 22 in the valve 5 is a coil spring 23 bearing against the end of the rod 17 and tending to keep the pin 21 at the top of the slot 20 but yielding to allow a slight relative movement between the valve 5 and the rod 17. Surrounding the sleeve 18 is the valve 11 having a stuffing box 24 through which the sleeve may slide vertically. A transverse pin 25 carried by the rod 17 extends through a slot 26 in the sleeve 18 and engages the valve 11 so that it will move with the rod 17. A lever 27 horizontally pivoted on a transverse rod 28 within the discharging chamber 12 is pivoted at one end to the rod 17. The other end of the lever 27 is pivoted to a piston rod 29. A lever 30 horizontally pivoted on a transverse rod 31 within the discharging chamber 12 is pivoted at one end to the sleeve 18. The other end of the lever 30 is pivoted to a piston rod 32.

The piston rods 29 and 32 may be operated in any suitable manner. In the present instance a pipe 33 is shown leading compressed air to a distributing valve 34 of any suitable form. From the distributing valve there is a pipe 35 leading to the bottom of a cylinder 36 within which travels a piston 37 on the piston rod 29. A pipe 38 leading from the distributing valve 34 enters the cylinder 36 at its top. A pipe 39 leads from the distributing valve 34 to the bottom of a cylinder 40 in which travels a piston 41 on the piston rod 32. A pipe 42 leads from the distributing valve 34 to the top of the cylinder 40. An upward extension of the piston rod 29 carries a valve 43 traveling in a chamber 44 provided at its lower end with a port 45 open to the atmospheric air. At the upper end of the chamber 44 is a pipe 46 connected to the upper part of the hopper 1 from which the air is exhausted. At about the middle of the chamber 44 is a pipe 47 leading to the upper portion of the chamber 9. An upward extension of the piston rod 32 carries a valve 48 traveling in a chamber 49. At the upper end of the chamber 49 is a pipe 50 connected with the upper part of the hopper 1 from which the air is exhausted. The pipes 46 and 50 might be consolidated and only one pipe used to connect both chambers 44 and 49 to the hopper 1. At about the middle of the chamber 49 is a pipe 51 leading to the upper portion of the chamber 6. An upward or downward movement of the piston 37 will cause the lever 27 to lower or raise the rod 17 thereby causing the valves 11 and 5 to open or close the throats 10 and 4. When the piston 37 is raised the valve 43 is raised so as to bring the pipe 47 leading from the chamber 9 into communication with the port 45 open to the atmospheric air. When the piston 37 is lowered the valve 43 is lowered thus bringing the pipe 47 leading from the chamber 9 into communication with the pipe 46 leading to the hopper 1. An upward or downward movement of the piston 41 will cause the lever 30 to lower or raise the sleeve 18 thereby causing the valve 8 to open or close the throat 7. When the piston 41 is lowered the valve 48 is lowered thus bringing the pipe 51 leading from the chamber 6 into communication with the pipe 50 leading to the hopper 1.

The distributing valve 34 admits compressed air to the pipes 35, 38, 39 and 42 in such order as to cause the pistons 37 and 41 and their associated valves 43 and 48 to be raised and lowered alternately thus causing the valves 5 and 11 to be opened together between openings of the valve 8.

Conveyed material entering the hopper 1 through the inlet 3 will settle toward the bottom of the hopper on to the valve 5 if closed. With the valves in the position shown in the drawings the material will pass through the throat 4 and settle in the chamber 6 on the valve 8. The distributing valve 34 will now admit compressed air through the pipe 38 to the upper side of the piston 37 forcing it downward and causing it to operate the lever 27 to close the valves 5 and 11. At the same time it will operate the valve 43 so as to cause the chamber 9 and the hopper 1 to be put in communication with the pipes 46 and 47. This will exhaust the air from the chamber 9 so that there is no more pressure therein than in the chamber 6 which has been open to the hopper 1 through the throat 4. There is now a pressure equalizing communication between the chambers 6 and 9 by way of the pipes 47 and 51 and the hopper 1. The distributing valve 34 may now admit compressed air through the pipe 39 to the lower side of the piston 41 thus causing it to rise and operate the lever 30 to open the valve 8 thus allowing the material previously admitted into the chamber 6 to drop into the chamber 9 and to settle on the valve 11 which is now closed. The distributing valve 34 may now admit compressed air through the pipe 42 to the upper side of the piston 41 forcing it downward and causing it to close the valve 8 through the lever 30. This movement of the piston 41 carries with it the valve 48 so as to put the chamber 6 into communication with the hopper 1 through the pipes 50 and 51 and thus exhaust the air from the chamber 6. The distributing valve 34 may now admit compressed air through the pipe 35 to the lower side of the piston 37 thereby causing it to rise and operate the lever 27 so as to open the valves 4 and 11. At the same time the movement of the piston 37 will cause the valve 43 to move and put the chamber 9 into communication with the atmospheric air through the pipe 47 and the port 45. This will cause the material in hopper 9 to fall through the chamber 12 into the stock pile or whatever receptacle is there provided for it. At the same time the valve 5 being open will admit a second quantity of material into chamber 6. This series of operations may be repeated and continued as long as the apparatus is in operation.

If there were a greater air pressure in the chamber 6 than in the hopper 1 when the valve 5 is opened there might be a tendency to hold material in the hopper and not let it pass into the chamber 6. Likewise if the air pressure were greater in the chamber 9 than in the chamber 6 when the valve 8 is opened the material might be impeded in its fall or forced back and the same would be true on the opening of the valve 11 if the chamber 9 were maintained at less than atmospheric pressure. It will be observed, however, that before the valve 5 is opened the pressure in the chamber 6 is equalized with the pressure in the hopper 1 so that there will be no air impediment to the flow of material through the throat 4. It will also be noted that before the valve 8 is opened the pressure in the chamber 9 is also equalized with that in the hopper 1 so there will be no impediment to the flow of material through the throat 7. It will be observed that before the valve 11 is entirely opened the pressure in the chamber 9 is equalized with the atmospheric pressure existing in the discharge chamber 12 so that there will be no impediment to the flow of material through the throat 10. The chamber 9 is materially larger in capacity than the chamber 6 so that on each opening of the valve 8 all of the material in the chamber 6 will flow into the chamber 9 and practically none of it will stick about the valve 8 or the throat 7. This arrangement makes the closing of the valve 8 always sure and certain and makes it possible to maintain at that point a close seal so that when the valve 11 is open atmospheric air will not force its way through the throat 7. The chamber 6, however, can not hold as much material as the hopper 1 and moreover there may appear in the hopper 1 lumps of the conveyed material, stones or other foreign matter which might interfere with the closing of the valve 5 or cause injury or damage to the apparatus. In order to provide for these contingencies and to avoid injury to the apparatus the valve 5 is not positively and rigidly forced into its seat in the throat 4 but there is inserted between the operating rod 17 and the valve 5 a spring 23 which may yield. It will be noted that even when the spring 23 has yielded and there is an opening therefor through the throat 4 there is no ingress of atmospheric air since either the valve 8 or the valve 11 or both are fully closed at all times. And the remaining opening is so small that the flow of material through the throat 4 may be substantially checked.

If the chamber 9 together with its valve 11 were omitted there would be no assurance of a seal when the valve 8 opens the outlet from the chamber 6. The valve 5 may be forced toward its seat 4 while material is flowing from the hopper 1 or it may happen that the chamber 6 is completely filled with material. Hence the valve 5 may entrap material between itself and the seat 4. When the material being operated upon is hard and contains lumps the presence of such material between the valve 5 and the seat 4 may prevent the valve from closing entirely. At such a time an opening of the valve 8 would allow air and material to be sucked into the hopper through the opening at its bottom around the valve 5 were it not for the fact that the chamber 9 is arranged below the valve 8 and provided with a valve 11 which closes the hopper 9 and thus produces an effective seal even though the valve 8 be open and the valve 5 be held away from its seat 4. The chamber 9 has a greater capacity than the chamber 6 so that when the valve 8 opens all the material in the chamber 6 may flow into the chamber 9 and thus allow the valve 8 to be closed firmly and snugly against its seat 7 without danger of entrapping lumps or other material which might tend to keep the valve 8 from its seat 7. If the chamber 9 were no larger than the chamber 6 there might be material remaining between the valve 8 and its seat at the time it is closed which would prevent the valve 8 sealing against incoming air when closed.

The details of the mechanism shown and described are illustrative but are not essential to the invention.

I claim as my invention:

1. In combination, a hopper, a discharging chamber, an upper intermediate chamber, a lower intermediate chamber, a resiliently supported valve between the hopper and the upper intermediate chamber, a valve between the intermediate chambers, a valve between the lower intermediate chamber and the discharging chamber, and means for operating the valves.

2. In combination, a hopper, a discharging chamber, an upper intermediate chamber, a lower intermediate chamber, a resiliently supported valve between the hopper and the upper intermediate chamber, a valve between the intermediate chambers, a valve between the lower intermediate chamber and the discharging chamber, and means for operating simultaneously the first and last mentioned valves between each operation of the valve between the intermediate chambers.

3. In combination, a hopper, a discharging chamber, an upper intermediate chamber, a lower intermediate chamber, a spring supported valve between the hopper and the upper intermediate chamber, a valve between the intermediate chambers, a valve between the lower intermediate chamber and the discharging chamber, and means for connecting the interior of the upper intermediate chamber with the interior of the hopper and then opening the valve between the hopper and the upper intermediate chamber, then connecting the interiors of the intermediate chambers and then opening the valve between the intermediate chambers, then connecting the interior of the lower intermediate chamber with the atmospheric air and then opening the valve between the lower intermediate chamber and the discharging chamber.

4. In combination, a hopper in which is a partial vacuum, a yielding cone valve closing an outlet at the bottom of the hopper, a chamber below the outlet of the hopper, a cone valve closing an outlet at the bottom of the chamber, a second chamber below the outlet of the aforesaid chamber, a cone valve closing an outlet at the bottom of the second chamber, and means for operating the valves but always keeping at least one of the valves closing the outlets in the chambers closed.

5. In combination, a hopper in which is a partial vacuum, a yielding valve closing an outlet at the bottom of the hopper, a chamber below the outlet of the hopper, a rigidly supported valve closing an outlet at the bottom of the chamber, a second chamber below the outlet of the aforesaid chamber, a rigidly supported valve closing an outlet at the bottom of the second chamber, and means for operating the valves but always keeping at least one of the rigidly supported valves closed.

6. In combination, a hopper in which is a partial vacuum, a yielding valve closing an outlet at the bottom of the hopper, a chamber below the outlet of the hopper, a valve closing an outlet at the bottom of the chamber, a second chamber below the outlet of the aforesaid chamber, a valve closing an outlet at the bottom of the second chamber, and means for operating the valves but always keeping at least one of the valves closing the outlets in the chambers closed.

7. In combination, an evacuated hopper, a spring supported valve at the bottom of the hopper, an upper intermediate chamber below the hopper, a valve for the said chamber, a lower intermediate chamber below the said chamber, a valve for the lower chamber, a piston for opening and closing the first and last valves, a piston for opening and closing the valve of the upper intermediate chamber, a valve moving with the first piston connecting the lower intermediate chamber with the hopper in one position and with the atmospheric air in the other position, and a valve moving with the second piston for connecting the upper intermediate chamber with the hopper.

8. In combination, an evacuated hopper, a spring supported valve at the bottom of the hopper, an upper intermediate chamber below the hopper, a valve for the said chamber, a lower intermediate chamber below the said chamber, a valve for the lower chamber, a piston for opening and closing the first and last valves, a piston for opening and closing the valve of the upper intermediate chamber, a valve moving with the first piston connecting the lower intermediate chamber with the hopper when the valves controlled by the piston are closed and with the atmospheric air when the valves controlled by the piston are open, and a valve moving with the second piston for connecting the upper intermediate chamber with the hopper when the valve for the upper intermediate chamber is closed.

9. In combination, an evacuated hopper having an opening, a valve for the hopper opening, a first intermediate chamber into which the hopper opens, a valve for the said chamber, a second intermediate chamber into which the first chamber opens, a valve for the second chamber, a piston for opening and closing the first and last valves, a second piston for opening and closing the valve of the first intermediate chamber, a valve moving with the first piston connecting the second intermediate chamber with the hopper in one position and with the atmospheric air in the other position, and a valve moving with the second piston for connecting the first intermediate chamber with the hopper.

10. In combination, an evacuated hopper, an intermediate chamber into which the hopper opens, a lower chamber into which the intermediate chamber opens and which has an opening, a closure for the hopper opening, a closure for the intermediate chamber opening, means for operating the last named closure, means acting with the said means for connecting the hopper with the intermediate chamber when the intermediate chamber is closed, a closure for the lower chamber opening, means for operating the last named closure, and means acting with the last named means for connecting the lower chamber with the hopper when the lower chamber opening is closed and for connecting the lower chamber with the atmospheric air when the lower chamber opening is open.

11. In combination, an evacuated hopper, an intermediate chamber into which the hopper opens, a lower chamber into which the intermediate chamber opens and which has an opening, a closure for the hopper opening, means for operating the closure but yielding when there is an impediment to the closure, means for operating the last named closure, means acting with the said means for connecting the hopper with the intermediate chamber when the intermediate chamber is closed, a closure for the lower chamber opening, means for operating the last named closure, and means acting with the last named means for connecting the lower chamber with the hopper when the lower chamber opening is closed and for connecting the lower chamber with the atmospheric air when the lower chamber opening is open.

12. A receiving hopper, a first intermediate chamber into which the hopper empties, a second intermediate chamber into which the first chamber empties and of greater capacity than the first chamber, the hopper and each chamber being provided with outlets, and separate valves for the outlet of the hopper and the outlet of each chamber.

GEO. A. GIESELER.